United States Patent [19]

Beckworth

[11] 4,315,580

[45] Feb. 16, 1982

[54] HAND HELD SEED PLANTER WITH ROLLER WHEEL STRUCTURE

[76] Inventor: James K. Beckworth, 904 Penn Waller Rd., Savannah, Ga. 31410

[21] Appl. No.: 178,364

[22] Filed: Aug. 15, 1980

[51] Int. Cl.³ .............................................. A01C 7/02
[52] U.S. Cl. ..................................... 221/185; 111/72; 111/74; 111/82; 221/265; 222/167; 222/369
[58] Field of Search ............... 111/34, 59, 72, 50, 111/78, 89, 71, 73, 74, 77, 79, 82; 222/169–172, 175, 167, 614, 369, 370; 221/217, 261, 277, 279, 280, 185, 263–265

[56] References Cited

U.S. PATENT DOCUMENTS

| 136,277 | 2/1873 | Stubbs | 111/78 |
|---|---|---|---|
| 516,639 | 3/1894 | Allen | 111/74 |
| 1,058,552 | 4/1913 | Clarke | 222/172 |
| 1,272,550 | 7/1918 | Smith | 111/74 |
| 1,912,248 | 5/1933 | Bateman et al. | 221/204 |
| 2,204,245 | 6/1940 | Bower | 222/167 |
| 2,663,462 | 12/1953 | Johnson | 222/167 |
| 3,031,984 | 5/1962 | Esmay | 111/74 X |
| 3,467,285 | 9/1969 | Nockleby | 222/171 |
| 3,622,042 | 11/1971 | Fischer | 221/265 |
| 3,774,557 | 11/1973 | Esmay | 111/82 |

FOREIGN PATENT DOCUMENTS

| 8209 | 1/1906 | Denmark | 111/78 |
|---|---|---|---|
| 458929 | 4/1928 | Fed. Rep. of Germany | 111/74 |
| 19200 | 6/1928 | Netherlands | 111/74 |
| 39026 | 6/1910 | Sweden | 111/82 |
| 152929 | 10/1920 | United Kingdom | 111/74 |
| 652797 | 5/1951 | United Kingdom | 111/82 |

*Primary Examiner*—James R. Feyrer
*Attorney, Agent, or Firm*—Mason, Fenwick & Lawrence

[57] ABSTRACT

A row seed planter for planting seeds in a prepared furrow in home gardens having a ground-engaging wheel-like seed reservoir and dispenser rotatable subassembly rotatably journaled on the lower end of an elongated handle member adapted to be hand-grasped near an upper end thereof and extend upwardly and rearwardly from the rotatable subassembly. The rotatable subassembly includes a rigid flat annular ground-engaging disc member having a large diameter center hole therethrough, a seed housing shell structure defining a seed chamber of predetermined capacity communicating with the center hole, a seed elevating disc fixed to the opposite side of the ground-engaging disc member from the seed chamber forming an opposite side closure wall for the center hole, and a single apertured seed discharge disc plate mounted closely adjacent the seed elevating disc and restrained against rotation relative to the handle member.

10 Claims, 5 Drawing Figures

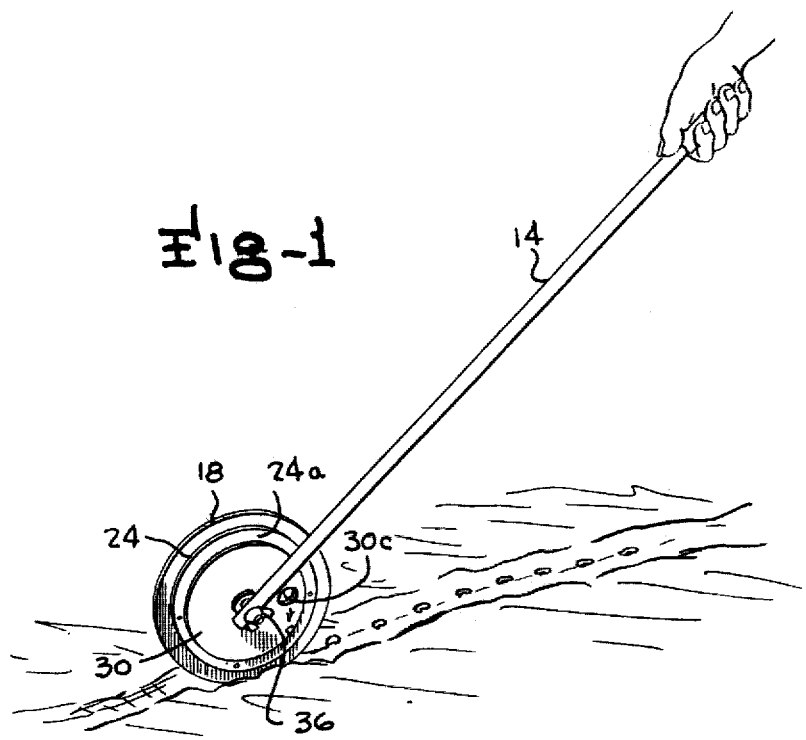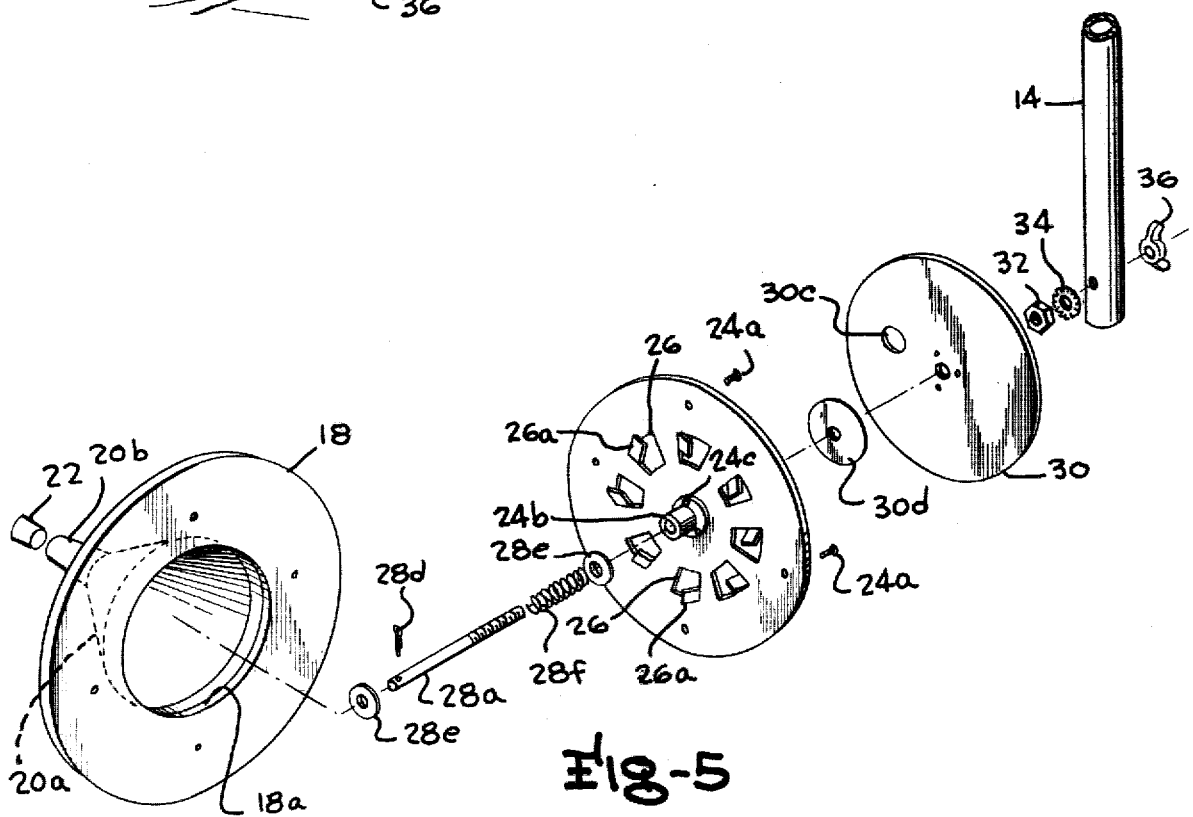

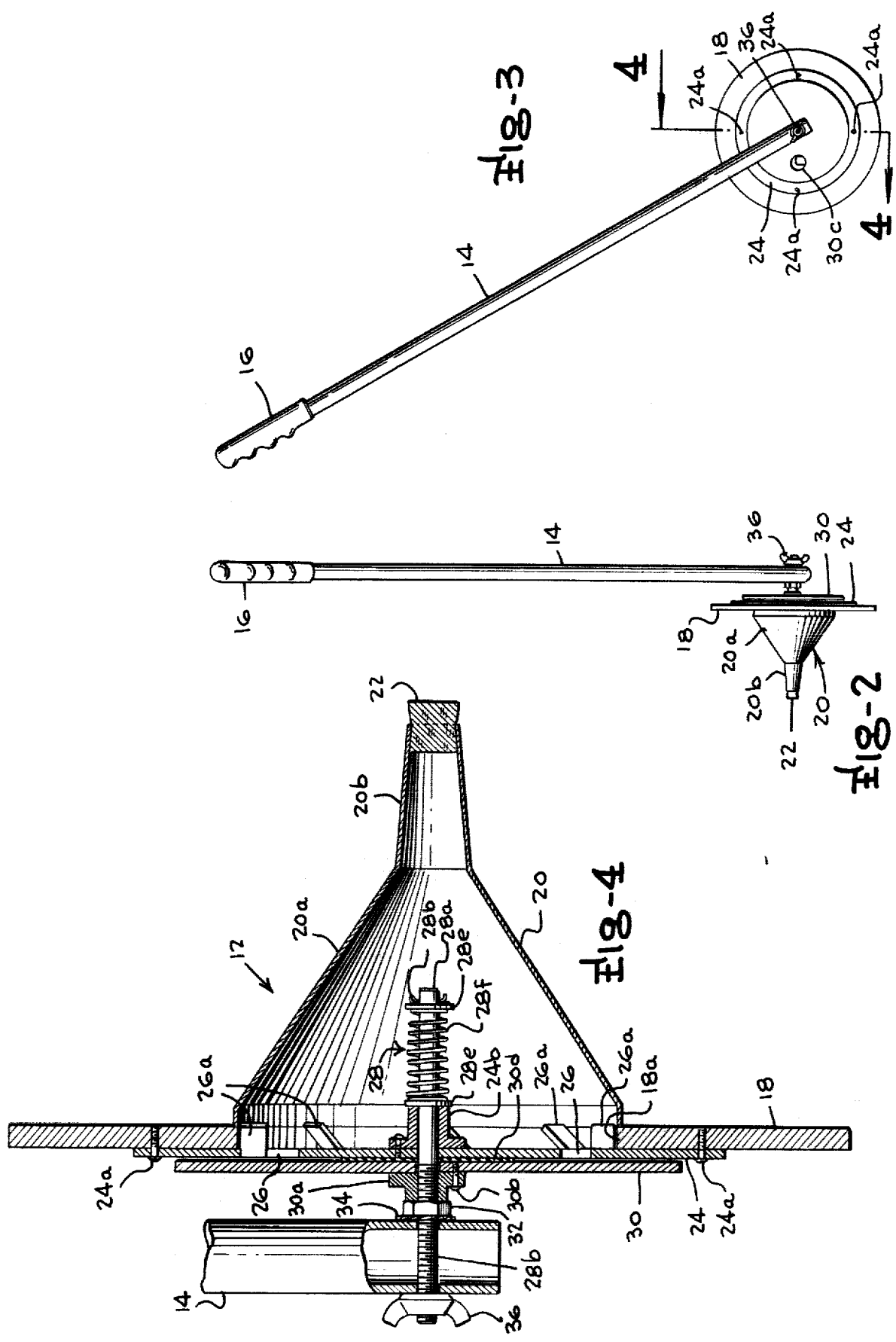

HAND HELD SEED PLANTER WITH ROLLER WHEEL STRUCTURE

BACKGROUND AND OBJECTS OF THE INVENTION

The present invention relates in general to home garden seed planters for use primarily by the suburban gardener for discharging vegetable seeds or flower seeds of various types at predetermined intervals along a row or furrow.

The preparation of suburban home garden plots is a tedious slow problem without equipment to faciliate the laying out and forming of the portions of the garden plot for receiving the seeds and the depositing of the seeds at the proper spacing, and then filling in of the dirt over the seeds in the garden row. For example, it involves laying out and formation of shallow, equally spaced furrows for receiving the seeds, followed by manually depositing the seeds one at a time at desired spacing in the various furrows, and then filling in of the furrows to return the removed dirt back into the shallow furrows over the seeds. Very little progress has been made in developing relatively simple, economical and sturdy devices aiding the suburban home gardener in carrying out these functions in a home vegetable garden, notwithstanding many advances in expensive and complicated commercial farming equipment for large planting operations.

Some types of home garden seed depositing implements have been proposed for row planting, one of which comprises a seed container mounted for rotation on a wheel journaled at the bottom of a long handle, wherein the seed container is provided with a plurality of openings which deposit a seed each time an opening reaches the bottom of the container as the wheel is rolled along the ground. Another similar device is shown in earlier U.S. Pat. No. 3,031,984, which is provided with a furrow-forming, small plough-like formation and an associated wheel which trails at a desired spaced location behind the furror former, together with a pair of overlapping cylindrical rims of confronting interfitted cupshaped seed containers having shaped openings in the overlapping flanges or rims through which the seeds are dispensed. However, improvement is desired in the simplicity, reduction in expense of manufacture and ability to discharge vegetable seeds of different types.

An object of the present invention, therefore, is the provision of a simple, inexpensive seed planter for use by the suburban gardener, which is formed of a novel combination of inexpensive parts providing a rotatable wheel-like seed holder and periodic dispenser structure rotatably mounted on the lower end portion of a long rigid handle, designed to discharge single seeds at regular intervals of about 4 inches as the device is rolled along the prepared garden row.

Another object of the present invention is the provision of a novel seed planter as described in the immediately preceding paragraph, wherein the seed holder is of simple funnel-shaped construction having a removable cork or the like in the narrower end opening at the free end of the small diameter tapered neck or stem portion, associated with a seed discharge disc and apertured seed tab disc for regulating discharge of the seeds.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of a home garden row seed planter constructed in accordance with the present invention;

FIG. 2 is a rear elevation view thereof;

FIG. 3 is a side elevation view thereof, viewed from the side visible in FIG. 1;

FIG. 4 is a vertical section view taken along the line 4—4 of FIG. 3; and

FIG. 5 is an exploded perspective view of the basic components forming the lower portion of the seed planter.

DETAILED DESCRIPTION OF A PREFERRED EMBODIMENT

Referring to the drawings, wherein like reference characters designate corresponding parts throughout the several figures, there is shown a row seed planter, indicated generally by the reference character 10, embodying my invention, which basically comprises a wheel-like rotatable seed reservoir and dispenser subassembly, indicated at 12, journaled near the lower end of an elongated handle 14 having a hand grip formation 16 at its upper end. The seed dispenser and reservoir unit 12 is conveniently formed of simple inexpensive parts, comprising a thin flat circular disc 18, for example an aluminum disc about ¼ inch thick by 10 inches in diameter, having a hole 18a in the center, for example about 4½ inches in diameter, joined to a funnel-shaped seed reservoir 20 having a frusto-conical main chamber portion 20a and a constricted outwardly convergently tapering neck portion 20b. The rim or edge of the larger diameter end of the frusto-conical chamber portion 20a is joined to the flat disc portion 18 in any suitable manner, as by soldering or other bonding medium with the edge or rim of the conical chamber portion 20a outwardly surrounding the boundry of the center hole 18a in the disc 18. Alternatively, the seed reservoir or holder 20 may be formed as an integral part of the disc member 18, either by molding from plastic or shaping aluminum or other thin metal. The tapered neck portion 20b of the seed reservoir member 20 forms the loading and unloading opening for the seed reservoir, and is conveniently removably closed in the illustrated embodiment by a cork 22 friction-held in the open end of the tapered neck portion 20b.

The subassembly of the circular disc 18 and seed reservoir 20 are assembled to a seed elevating disc or seed tab disc 24 of somewhat smaller diameter than the disc 18 but larger than the center opening of the disc 18, for example about 7 inches in diameter formed as a circular disc of flat 1/16th inch thick aluminum, having fastener holes spaced circumferentially along the disc 24 near its perimeter, for example four holes at quadrature locations of about 9/64th inch diameter, for receiving round head screws, indicated at 24a, into tapped holes therefor in the larger disc 18 of the reservoir and dispenser unit 12. The seed tab disc 24 also includes a central bushing 24B, for example a flanged end bronze bushing 24b, secured by screws 24c extending into tapped openings in the disc 24 in concentric relation to the center axis of the disc 24 and having a ¼ inch diameter center opening. The seed tab disc 24 also includes a circumferentially spaced array of substantially truncated triangular or isosceles trapezoid-shaped seed transfer openings 26 therein, for example having a width of about ⅛th inch at their outermost edge and about 9/16th inch along their radially innermost edge, and a radial height of about ⅞th inch to 1 inch, from the trailing edge of which extends an outwardly inclined seed tab formation 26a at each opening 26 which is about 5/16th inch at its outermost edge adjacent the ⅞th inch edge of the seed transfer openings and extends at an angle of 45° from the plane of the adjacent face of the seed tab disc 24. Thus the inclined seed tab formations 26a project into the main seed holding chamber 20a of the seed reservoir 20 to elevate seeds from the lower part of the chamber 20a during rotation of the reservoir and dispenser 12 as later described. The bushing 24b may, if desired, be assembled to the seed tab disc 24 by rivets rather than the screws 24c as described, or the bushing may be made as an integral part of the disc 24, and, of course, the disc and bushing assembly 24,24b may be formed as an integral cast member from some type of plastic rather than using the metal components as described.

A shaft and spring assembly generally indicated at 28 is assembled through the opening of the bushing 24b with the seed tab disc 24, and comprises, in the illustrated embodiment, a shaft 28a which is threaded over a portion only of its length, for example a 3⅛th inch long, ¼ inch diameter shaft threaded along about 1⅛th inch of its length from one end, as indicated at 28b, and having a diametric hole 28c through its opposite end portion to accept a cotter pin 28d. A pair of flat washers 28e are assembled on the unthreaded portion of the shaft 28a along with a coil spring 28f restrained between the washers 28e in the assembled construction when the threaded portion 28b is installed through the center opening of the bushing 24b of the seed tab disc 24.

A seed discharge disc 30, for example a ⅛th inch thick, 6 inch diameter flat aluminum disc, is assembled against the opposite face of the seed tab disc 24 from that abutted by the ground-engaging disc 18, and includes a threaded flanged disc nut 30a attached, for example, by three equally spaced round head screws 30b and having a threaded ¼ inch hole therethrough. Obviously the flanged disc nut 30a may be attached by other securing means, such as flat head rivets, or may be formed as an integral part of the discharge disc 30. A thin spacer gasket 30d, for example a 2 inch diameter spacer gasket with a ¼ inch hole in the center, may be assembled on the threaded portion 28b of the shaft 28a projecting through the center hole of the bushing 24b, to be located between the seed tab disc 24 and seed discharge disc 30 and reduce friction between the disc 24 and 30, and a hex nut 32 is then assembled onto the threaded portion 28b of the shaft 28a on the opposite side of the discharge disc 30 from the seed tab disc 24, followed by a lock washer 34. The lock washer 34, when this subassembly is assembled onto the handle 14, then bears against the confronting surface of the handle 14 and against the hex nut 32 and prevents the seed discharge disc 30 from rotating. The threaded portion 28b of the shaft 28a projects through the hole in the lower end portion of the handle 14, and wing nut 36 is assembled onto the threaded portion 28b protruding from the opposite end of the handle 14 to secure the complete rotatable planter assembly to the planter handle 14.

In the use of the row seed planter, the device is loaded with seed by removing the cork 22 from the end of the tapered neck portion 20b of the seed reservoir 20 to load seed into the chamber 20a. The planter is designed to discharge a number of different types of seeds, including corn, butter bean, snap beans, peas, etc. The access opening at the end of the tapered neck portion 20b of the seed reservoir 20 is closed by replacing the cork 22 in the opening, and the planter is positioned at the beginning of the prepared row or furrow in which the seed is to be planted, with the perimeter of the ground-engaging wheel 18 disposed in the prepared row or furrow at the starting end. The seed discharge disc 30 is prepositioned relative to the handle 14 to assume a position somewhat above the 6 o'clock or lowermost position, for example at about a 9 o'clock position as illustrated in FIG. 3, and is retained in that position because of the threaded flanged disc nut 30a and hex nut 32 threaded onto the portion 28b of the shaft 28 and because of the lock washer 34 which locks the nut 32 and flanged disc nut 30a against rotation relative to the handle 14 when the wing nut 36 is turned tight. As the seed reservoir and dispenser assembly 12 is rotated down the furrow or row, the seed tab disc 24 which is secured by screws to the ground-engaging disc 18 also rotates, whereupon the inclined seed tab formations 26a lift seed located in the bottom portion of the seed holder chamber 20a to the level of the discharge hole 30c in the seed discharge disc 30, dispensing the seed one at a time through the seed discharge opening 30c to drop into the furrow or row at about a 4 inch spacing between successive seeds. The spacer gasket 30d interposed between the seed tab disc 24 and seed discharger disc 30 acts as a spacer and also produces friction between the components which undergo relative movement. After the planter has been rolled down the row or rows into which any particular kind of seed is to be discharged, the row is covered in the usual manner, and excess seed may be removed simply by removing the cork 22 from the tapered neck portion 20b to return the seed to the package or storage container, and other kinds of seeds can then be loaded into the planter to dispense the seed into other rows or furrows.

I claim:

1. A row seed planter for planting seeds in a prepared furrow in home gardens and the like, comprising a ground-engaging wheel-like seed reservoir and dispenser rotatable subassembly, an elongated handle member adapted to be hand-grasped near an upper end thereof and extend upwardly and rearwardly from the rotatable subassembly and provide rotary journal support therefor, the rotatable subassembly comprising a rigid flat annular ground-engaging disc member having a large diameter center hole there-through, a seed housing shell structure encircling said axis along a circular cross-section path concentric with said axis joined to and extending from one side of said ground-engaging disc member defining a seed chamber of predetermined capacity communicating with said center hole and having a removable closure covered fill opening at an end portion thereof spaced from said disc member, a seed elevating disc fixed to the opposite side of said ground-engaging disc member from said seed chamber forming an opposite side closure wall for said center hole, and having an apertured center bushing, a horizontal center shaft rotatably journaled in said bushing and having a threaded portion projecting from said seed elevating disc through and journaled in the lower end portion of said handle member, a single apertured seed discharge disc plate concentric with said axis mounted closely adjacent said seed elevating disc on the threaded portion of said shaft and restrained against rotation relative to said handle member to locate the aperture therein as a seed discharge opening at a predetermined level above the lowermost portion of said chamber, and said seed elevating disc having a plurality of seed transfer openings therethrough bounded along trailing edges thereof by inclined lift tabs projecting into said chamber and located in circumferentially spaced relation along a circular path registering with said seed discharge opening to lift seeds from the lowermost zone of said chamber to said discharge opening for single-seed discharge therethrough at spaced intervals along the furrow as the planter is rolled therealong.

2. A row seed planter as defined in claim 1, wherein said center shaft has a non-threaded portion projecting through said bushing and into the seed chamber, said bushing being fixed to said seed elevating disc and having a bore therethrough sized to receive and freely rotate on the non-threaded shaft portion.

3. A row seed planter as defined in claim 1, wherein said center shaft has a non-threaded portion projecting through said bushing and into the seed chamber, said bushing being fixed to said seed elevating disc and having a bore therethrough sized to receive and freely rotate on the non-threaded shaft portion and said non-threaded shaft portion having a coil spring encircling the same compressed between a stop shoulder formation on the shaft and said bushing to resiliently urge the shaft axially inwardly of the seed chamber in a direction away from the handle member.

4. A row seed planter as defined in claim 1, wherein said ground-engaging disc member and seed elevating disc and seed discharge disc plate are circular flat plate members disposed in closely adjacent side-by-side relation in parallel planes with said seed elevating disc sandwiched between the other two discs and said lift tabs protruding through the center hole in said ground-engaging disc member into said seed chamber portion encircled by said shell structure.

5. A row seed planter as defined in claim 2, wherein said ground-engaging disc member and seed elevating disc and seed discharge disc plate are circular flat plate members disposed in closely adjacent side-by-side relation in parallel planes with said seed elevating disc sandwiched between the other two discs and said lift tabs protruding through the center hole in said ground-engaging disc member into said seed chamber portion encircled by said shell structure.

6. A row seed planter as defined in claim 3, wherein said ground-engaging disc member and seed elevating disc and seed discharge disc plate are circular flat plate members disposed in closely adjacent side-by-side relation in parallel planes with said seed elevating disc sandwiched between the other two discs and said lift tabs protruding through the center hole in said ground-engaging disc member into said seed chamber portion encircled by said shell structure.

7. A row seed planter as defined in claim 1, wherein said seed discharge disc plate includes a threaded flanged disc nut threaded onto the threaded portion of said shaft, and a threaded lock nut and a lock washer being assembled on said shaft between said disc nut and the adjacent portion of said handle member in tight engagement therewith to restrain the seed discharge disc plate against rotation about said shaft.

8. A row seed planter as defined in claim 2, wherein said seed discharge disc plate includes a threaded flanged disc nut threaded onto the threaded portion of said shaft, and a threaded lock nut and a lock washer being assembled on said shaft between said disc nut and the adjacent portion of said handle member in tight engagement therewith to restrain the seed discharge disc plate against rotation about said shaft.

9. A row seed planter as defined in claim 3, wherein said seed discharge disc plate includes a threaded flanged disc nut threaded onto the threaded portion of said shaft, and a threaded lock nut and a lock washer being assembled on said shaft between said disc nut and the adjacent portion of said handle member in tight engagement therewith to restrain the seed discharge disc plate against rotation about said shaft.

10. A row seed planter as defined in claim 6, wherein said seed discharge disc plate includes a threaded flange disc nut threaded onto the threaded portion of said shaft, and a threaded lock nut and a lock washer being assembled on said shaft between said disc nut and the adjacent portion of said handle member in tight engagement therewith to restrain the seed discharge disc plate against rotation about said shaft.

* * * * *